United States Patent [19]

Yamasaki et al.

[11] Patent Number: 4,661,291

[45] Date of Patent: Apr. 28, 1987

[54] METHOD FOR FIXATION OF INCINERATOR ASH OR IODINE SORBENT

[75] Inventors: Nakamichi Yamasaki, Kouchi; Takeshi Kubota, Ibaragi; Yoshihiro Hoshino, Kashiwa; Hiroyuki Tanuma, Hachiouji, all of Japan

[73] Assignee: Mitsui Engineering & Shipbuilding Co., Ltd., Tokyo, Japan

[21] Appl. No.: 764,686

[22] Filed: Aug. 9, 1985

[30] Foreign Application Priority Data

Sep. 25, 1984 [JP] Japan .................................. 59-199743
Oct. 24, 1984 [JP] Japan .................................. 59-223279

[51] Int. Cl.$^4$ .............................................. G21F 9/16
[52] U.S. Cl. .................................... 252/629; 252/628; 252/631; 422/159; 501/152; 501/153; 501/154; 501/155
[58] Field of Search ............... 252/629, 631, 633, 632, 252/628; 501/152–155; 502/63, 118; 423/328, 249, 240–241; 422/159; 419/48–49, 51, 68; 75/0.5 A

[56] References Cited

U.S. PATENT DOCUMENTS

| | | | |
|---|---|---|---|
| 3,167,504 | 1/1965 | Hayden et al. | 252/628 |
| 3,196,106 | 7/1965 | Haden et al. | 252/628 |
| 4,028,265 | 6/1977 | Barney et al. | 252/629 |
| 4,088,737 | 5/1978 | Thomas et al. | 252/629 |
| 4,204,980 | 5/1980 | Pasha et al. | 252/629 |
| 4,229,317 | 10/1980 | Babad et al. | 252/629 |
| 4,377,507 | 3/1983 | Pope et al. | 252/629 |
| 4,430,257 | 2/1984 | Pope et al. | 252/629 |

OTHER PUBLICATIONS

Burger et al., 1983, The Status of Radioiodine Control for Nuclear Fuelreprocessing Plants, Prepared for U.S. D.O.E. 49 pages.

Vance et al., 1981, Ceramic Phases for Immobilization of $^{129}$I. Rockwell International Energy Systems Group, California, Jul. 43 pages.

Primary Examiner—John F. Terapane
Assistant Examiner—Howard J. Locker
Attorney, Agent, or Firm—Manabu Kanesaka; C. Bruce Hamburg; Frank J. Jordan

[57] ABSTRACT

According to the method of this invention for fixation of incinerator ash, incinerator ash containing $SiO_2$ and $Al_2O_3$ is incorporated with NaOH or NaOH and an $SiO_2$-containing substance in such an amount that the resulting mixture contains 25 to 90 wt % of $SiO_2$, 2 to 10 wt % of $Na_2O$, and more than 3 wt % of $Al_2O_3$ which is less than the content of $SiO_2$ in terms of mol %; 100 parts by weight of the mixture is mixed with more than 5 parts by weight of water; and the resulting mixture is subjected to hydrothermal reaction under a pressure of 70 kg/cm$^2$ or above and at a temperature of 150° C. and above, whereby the fixation is accomplished.

According to the method of this invention for fixation of iodine sorbent, iodine is allowed to be adsorbed on a silver-loaded silicate sorbent; the iodine sorbent is mixed with 1 to 30 wt % of at least one of sodium hydroxide, potassium hydroxide, and barium hydroxide; and the resulting mixture is subjected to hydrothermal reaction under a pressure of 70 kg/cm$^2$ and above and at a temperature of 150° C. and above, whereby the fixation is accomplished.

21 Claims, 6 Drawing Figures

METHOD FOR FIXATION OF INCINERATOR ASH OR IODINE SORBENT

FIELD OF THE INVENTION AND RELATED ART STATEMENT

The present invention relates to a method for fixation of incinerator ash or iodine sorbent, and more particularly to a method for fixation of incinerator ash or iodine sorbent by hydrothermal reaction.

When it comes to disposal, incinerator ash needs special attention because it contains various kinds of metals. If it is disposed of as such by landfill or ocean dumping, metals will leach out from it. Incinerator ash of radioactive waste should undergo the fixation process prior to its disposal in order to suppress radioactivity and ensure safe handling.

The conventional fixation method includes cement fixation method and asphalt fixation method. These methods have a disadvantage that incorporation of incinerator ash into a large amount of fixation material results in an increase of waste. The ashphalt fixation method has another disadvantage that asphalt is combustible, the fixed product needs fire protection, and the fixed product is poor in strength.

For the disposal of radioactive waste, the plastics fixation method or melt fixation method are employed. Their disadvantages are that solidification matrices and containers are expensive and disposal can be accomplished only by large-scale facilities which need a high running cost.

In the case of volatile radioactive iodine discharged from nuclear fuel reprocessing plants or nuclear power stations, it is usually captured in the form of solution or by adsorption on sorbent such as activated carbon and silver-loaded zeolite. Radioactive iodine in the form of solution or adsorbed on a sorbent is very poor in both physical properties (mechanical strength and heat resistance) and chemical properties (resistance to water, acid, and alkali), and it is not suitable for long-term storage. (See Report UTNL-R0160 (1982) published by the Nuclear Engineering Research Institute affiliated to the Department of Technology, Tokyo University.) As the result of recent development in the fixation method, there has been proposed a method for fixing in cement a silver-loaded sorbent which has adsorbed radioactive iodine. (See PNL-4689 (1983) by Burger and Scheele.) The cement fixation method is expected to be of practical value because of its simplicity. However, the cement fixed body is difficult to be made compact, and there is a possibility of iodine leaching out. (Note that $^{129}I$ has a half life as long as 17 million years.) Thus it has to be sealed in a compact high-strength fixed body. Unfortunately, fixation requires a large amount of cement and the resulting fixed bodies are inevitably bulky and they need a large storage space. These disadvantages cause a bottleneck when the cement fixation method is put to practical use.

There is disclosed in DOE/ET/41900-9 (ESG-DOE-13354) Nuclear Waste Management, US-70 a method for disposing of radioactive iodine. According to this method, an alkaline waste liquid containing radioactive iodine is mixed with a silicate compound to make sodalite, which is then sintered at 1000° C. Sintering has to be accomplished completely at a high temperature, while avoiding the volatilizaton of captured iodine, which needs a complex apparatus and involves technical difficulties in practical use.

As mentioned above, the conventional methods for fixation of incinerator ash have disadvantages that fixed bodies are bulky, combustible, and weak in strength, and expensive large-scale facilities are required. Also, the conventional methods for fixation of iodine sorbents involve technical difficulties in the sealing of iodine.

SUMMARY OF THE INVENTION

It is an object of this invention to provide a method for fixation of incinerator ash or iodine sorbent, said fixation being accomplished by forming very strong, compact fixed bodies.

It is another object of this invention to provide a method for fixation of incinerator ash or iodine sorbent, said fixation being accomplished by forming fixed bodies which are superior in storage stability, with very little leaching of metal ions or iodine.

It is another object of this invention to provide a method for fixation of incinerator ash or iodine sorbent, said fixation being accomplished by forming fixed bodies which are very small in volume.

According to the method of this invention for fixation of incinerator ash, incinerator ash containing $SiO_2$ and $Al_2O_3$ is incorporated with NaOH or NaOH and an $SiO_2$-containing substance in such an amount that the resulting mixture contains 25 to 90 wt% of $SiO_2$, 2 to 10 wt% of $Na_2O$, and more than 3 wt% of $Al_2O_3$ which is less than the content of $SiO_2$ in terms of mol%; 100 parts of the mixture is mixed with more than 5 parts by weight of water; and the resulting mixture is subjected to hydrothermal reaction under a pressure of 70 kg/cm$^2$ and above and at a temperature of 150° C. and above, whereby the fixation is accomplished.

According to the method of this invention for fixation of iodine sorbent, iodine is adsorbed on a silver-loaded silicate sorbent; the sorbent is mixed with 1 to 30 wt% of at least one of sodium hydroxide, potassium hydroxide, and barium hydroxide; and the resulting mixture is subjected to hydrothermal reaction under a pressure of 70 kg/cm$^2$ and above and at a temperature of 150° C. and above, whereby the fixation is accomplished.

DESCRIPTION OF THE PREFERRED EMBODIMENTS

The invention is now described in more detail. In this specification, percent (%) to indicate the composition means wt% unless otherwise mentioned.

The method of this invention for fixation of incinerator ash is applied to incinerator ash containing $SiO_2$ and $Al_2O_3$. Such ash is left after incineration of municipal waste, industrial waste, and waste from atomic energy facilities (such as atomic power plants, nuclear fuel reprocessing plants, and laboratories.) The last category includes wood, cloth, paper towel, computer printing paper, polyethylene film, ion exchange resin, rubber gloves, garbage, etc.

According to this invention, incinerator ash is incorporated with NaOH or NaOH and an $SiO_2$-containing substance to make a mixture composed of 25 to 95% of $SiO_2$, 2 to 10% of $Na_2O$, and more than 3% of $Al_2O_3$. The content of $Al_2O_3$ in terms of mol% in the mixture is less than the content of $SiO_2$ in terms of mol%.

Usually the content of $Na_2O$ in incinerator ash is about 1% or less; and therefore the addition of NaOH is essential in this invention. Usually the content of $SiO_2$ and $Al_2O_3$ in incinerator ash is in the range of the above-mentioned composition; therefore, the addition of $SiO_2$ is not essential in this invention. If the content is outside the above-mentioned range, it is necessary to adjust the content by adding an $SiO_2$-containing substance.

Preferred examples of the $SiO_2$-containing substance include silica-stone powder, white clay powder, zeolite, soda glass, silicate glass, silica-containing glass, silica glass, sodium borosilicate glass, silica gel, and $SiO_2$-rich incinerator ash. The powder of $SiO_2$-containing substance should preferably be finer than 100 μm in particle diameter; but it may contain coarse particles (greater than 100 μm) up to 50% by volume.

It is convenient to add NaOH in the form of aqueous solution because water is added to the mixture afterward, as mentioned below. According to this invention, more than 5 parts by weight, preferably 5 to 20 parts by weight of water is added to the mixture. The water should preferably be added in the form of aqueous solution of sodium hydroxide as mentioned above; but it may also be added alone.

After the addition of water and mixing, the resulting mixture is subjected to hydrothermal reaction under a pressure of 70 kg/cm$^2$ and up and a temperature of 150° C. and up, whereby the fixing is accomplished. In other words, the hydrothermal reaction forms the three-dimensional skeleton structure (network) of at least partially hydrated alkali-containing aluminosilicate, whereby incinerator ash is fixed and metals (particularly heavy metals) in incinerator ash are sealed in the network.

The following is an explanation of why the range of the content of $SiO_2$, $Al_2O_3$, and $Na_2O$ is established as mentioned above.

$SiO_2$ takes part in forming the network of alkali-containing aluminosilicate. If the content is less than 25%, the network is not formed sufficiently and the fixed body is poor in strength. The upper limit of the content of $SiO_2$ is established at 95%, because the lower limit of the content of $Na_2O$ and $Al_2O_3$ is 2% and 3%, respectively; therefore, it is not critical. The preferred content of $SiO_2$ is 30 to 60%.

$Al_2O_3$ alone does not take part in forming the network; but it does by replacing a part of $SiO_2$ in the network. Aluminum that has replaced Si in the network is negatively charged and attracts positively charged metal ions. If the content of $Al_2O_3$ is less than 3 wt%, the network does not seal metal ions therein completely. If the content of $Al_2O_3$ in terms of mol% is greater than that of $SiO_2$ in terms of mol%, the network does not grow completely.

$Na_2O$ reacts with $SiO_2$ and $Al_2O_3$ during the hydrothermal reaction to accelerate the hydrothermal reaction and the formation of the alumino-silicate network. If the content of $Na_2O$ is less than 2%, the reaction and network formation are not accelerated sufficiently. Conversely, if the content exceeds 10%, the aluminosilicate network is broken and the fixed body is weak and hence the network does not completely seal metal ions therein.

The amount of NaOH in the mixture is expressed in terms of the content of $Na_2O$. In other words, NaOH in the mixture is assumed to be composed of $Na_2O$ and $H_2O$, and the amount of $H_2O$ derived from NaOH is combined with the water added separately and is not included in the weight of incinerator ash being disposed of.

The amount of water to be added to the mixture is more than 5 parts by weight, preferably 5 to 20 parts by weight for 100 parts by weight of the mixture. If the amount of water is less than 5 parts by weight, the hydrothermal reaction does not proceed completely; and conversely if the amount of water exceeds 20 parts by weight, the resulting fixed body is so porous and weak that metals will leach out easily.

The mixture may contain metal oxides such as $Fe_2O_3$, $Cr_2O_3$, MgO, CaO, $TiO_2$, and $K_2O$ in addition to the above-mentioned $SiO_2$, $Al_2O_3$, and $Na_2O$. Their amount and kind are not specifically limited; up to 40% is permissible without adverse effect on strength. In addition, the mixture may contain anions such as $SO_4^{--}$, $Cl^-$, $PO_4^{---}$, $CO_3^{--}$, $IO_3^-$, and $I^-$ in an amount up to 20% in total. Where $SO_4^{--}$ is present in the form of gypsum ($CaSO_4$), it accelerates the fixing reaction of incinerator ash.

The method of this invention for fixation of iodine sorbent can be applied to the disposal of radioactive iodine originating from nuclear fuel reprocessing plants and atomic power plants. It can also be applied to the disposal of iodine of any origin.

The sorbent used for the adsorption of iodine is a silver-loaded silicate adsorbent such as silver-loaded zeolite, silver-loaded mordenite, and silver-loaded silica gel. The amount of silver loaded is not specifically limited; but is is 5 to 50%, preferably 10 to 40%.

Iodine is brought into contact with a silver-loaded adsorbent by using a common adsorber. The contact is accomplished by passing an iodine-containing fluid through a metal casing filled with a silver-loaded adsorbent. Upon contact with a silver-loaded silicate adsorbent, iodine is adsorbed by the adsorbent. A part of iodine passes into AgI and the remainder remains in the form simple substance or forms an instable bond with Ag. The amount of adsorbed iodine is not specifically limited; and the saturated adsorbent can be processed for fixation.

In the practicing of the method of this invention for fixation of iodine sorbent, the sorbent which has adsorbed iodine may be crushed, if necessary. (Where the adsorbent is silica gel, it is desirable to crush it into power finer than 100 μm in particle diameter because it is slow in fixing reaction and is hard to fix. Where the adsorbent is zeolite or mordenite, crushing is not advisable because it might give off a gas when crushed.) Subsequently, the adsorbent is incorporated with one or more than one of sodium hydroxide, potassium hydroxide, and barium hydroxide, preferably followed by thorough mixing. This mixing may be accomplished simultaneously with the above-mentioned crushing in a mill. The addition of an alkali metal hydroxide or alkaline earth metal hydroxide changes the physically adsorbed iodine into stable AgI or $AgIO_3$ according to the following reaction formula.

$$3I_2 + 6OH^- + 6Ag^+ \rightleftharpoons AgIO_3 + 5AgI + 3H_2O$$

According to this invention, the mixture of the adsorbent that has adsorbed iodine and an alkali metal hydroxide or alkaline earth metal hydroxide is subjected to a hydrothermal reaction. Therefore, it is preferable to add water necessary for the reaction. Where barium hydroxide is used, the addition of water is not necessarily required because it contains a large amount of water of crystallization which is enough to permit the hydrothermal reaction to proceed.

Where water is to be added, it is permissible to add water alone or in the form of aqueous solution of sodium hydroxide, potassium hydroxide, or barium hydroxide.

The mixture of a silicate adsorbent that has adsorbed iodine and an alkali metal or alkaline earth metal hydroxide, said mixture containing water (and/or water of crystallization), undergoes hydrothermal reaction under a pressure of 70 kg/cm$^2$ and up and at a temperature of 150° C. and up, whereby the mixture is fixed.

The hydrothermal reaction forms the three dimensional skeleton structure (network) of alkali-containing aluminosilicate which is at least partially hydrated. Through this reaction, the mixture composed mainly of silicate adsorbent is made into a compact strong solid and the iodine adsorbed onto the adsorbent is sealed in the network.

During the hydrothermal reaction, sodium hydroxide, potassium hydroxide, or barium hydroxide reacts with $SiO_2$ and $Al_2O_3$ constituting the adsorbent, accelerating the hydration reaction and the reaction to form the network of aluminosilicate. If the amount of alkali hydroxide or alkaline earth metal hydroxide added is less than 1%, the reaction is not sufficiently accelerated; and if it is in excess of 30%, the network of aluminosilicate is broken and the fixed body is poor in strength and the sealing of iodine by the network is incomplete.

The amount of water to be contained in the mixture should preferably be 2 to 20 parts by weight for 100 parts by weight of the mixture. If the water content is less than 2 parts by weight, the hydrothermal reaction does not proceed sufficiently. If the water content exceeds 20 parts by weight, the resulting fixed body is excessively porous (a large number of pores and a large pore diameter) and is so weak that iodine will leach out.

The hydrothermal reaction for fixation of incinerator ash or iodine sorbent should be performed under a pressure of 70 kg/cm$^2$ and above. The upper limit of the pressure is practically about 500 kg/cm$^2$. Needless to say, the pressure should be higher than the vapor pressure of water at the reaction temperature so that the hydrothermal state is established.

The hydrothermal reaction should be performed at 150° C. and above; otherwise, the fixation reaction does not proceed and the resulting fixed body is very weak. The preferred temperature is 200° to 350° C.

The hydrothermal reaction should be performed for 5 minutes to 1 hour. The reaction time may be extended where the reaction pressure and temperature are low and may be shortened where the reaction pressure and temperature are high. In the research by the present inventors, it was found that strong fixed bodies are obtained when the hydrothermal reaction is performed for a long time at as low a pressure and temperature as possible within the above-mentioned range.

The hydrothermal reaction in this invention may be conveniently performed by using an apparatus made up of a cylinder and a piston fitted into one end thereof or two pistons fitted into both ends thereof, and a reaction chamber enclosed by the cylinder and piston(s). The mixture formed by adding water and mixing is filled in the reaction chamber, and it is compressed by the piston and heated simultaneously, whereby the hydrothermal reaction is performed. After a prescribed period of time, the reaction apparatus is cooled and the fixed body is discharged.

What is important for the fixation reaction is that the mixture be heated under pressure during the reaction. Therefore, the pressurization and heating may be performed separately or simultaneously.

Figure 1:
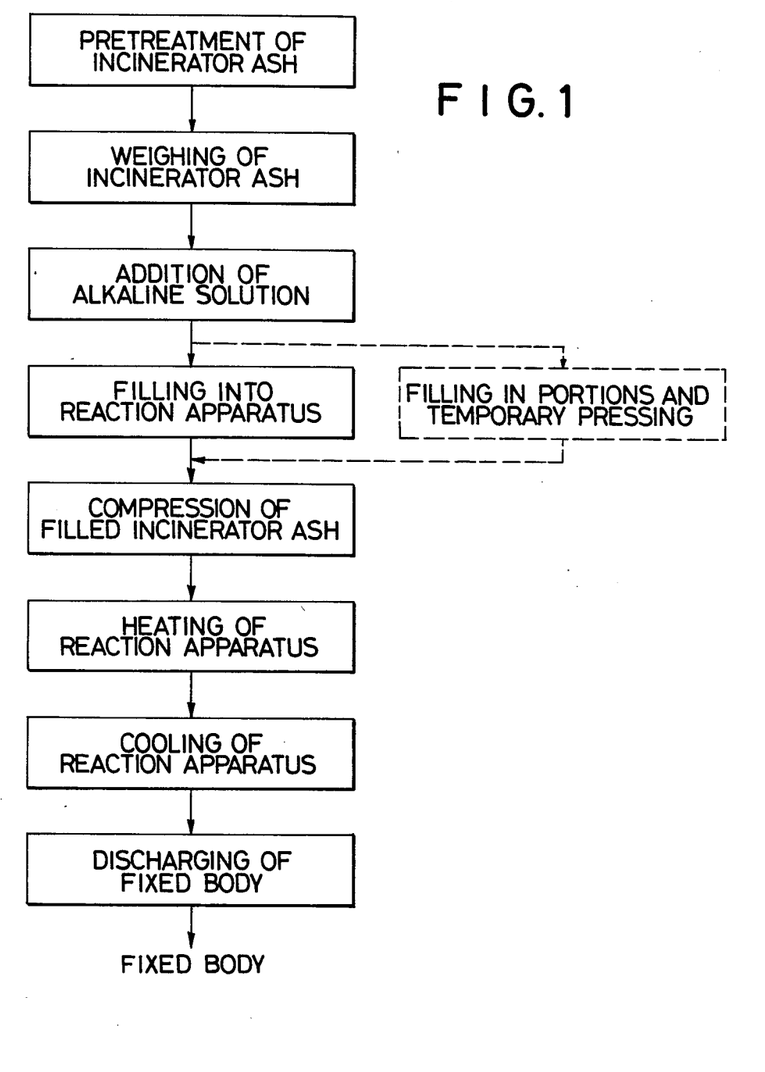
FIG. 1 is a block diagram showing a procedure for fixing incinerator ash according to the method of this invention.

FIG. 1 is a block diagram showing a procedure of fixing incinerator ash according to this invention by using the above-mentioned apparatus.

In the first step, incinerator ash undergoes pretreatment for the removal of noncombustible materials such as bolts and wires and large aggregates. This pretreatment makes easy the subsequent steps. In the following steps, incinerator ash is weighed and a prescribed amount of NaOH aqueous solution is added with mixing. The resulting mixture is filled in the reaction apparatus for hydrothermal reaction under pressure and heating. After a prescribed period of time, the reaction apparatus is cooled and the fixed body is discharged.

It is recommended that the charging of the mixture into the reaction apparatus be performed in several portions and each portion be compressed (temporarily) each time after charging. The temporary compression reduces the volume of individual portions charged, and consequently it is possible to fill a large amount of the mixture into the reaction apparatus or it is possible to reduce the capacity of the reaction apparatus for a certain amount of the mixture. The temporary compression may be achieved with about one-tenth the pressure employed for the fixing reaction. After all the mixture has been charged into the reaction apparatus by repeating the temporary compression as many times as the number of portions, the fixing reaction is started by applying the prescribed pressure.

Figure 2:
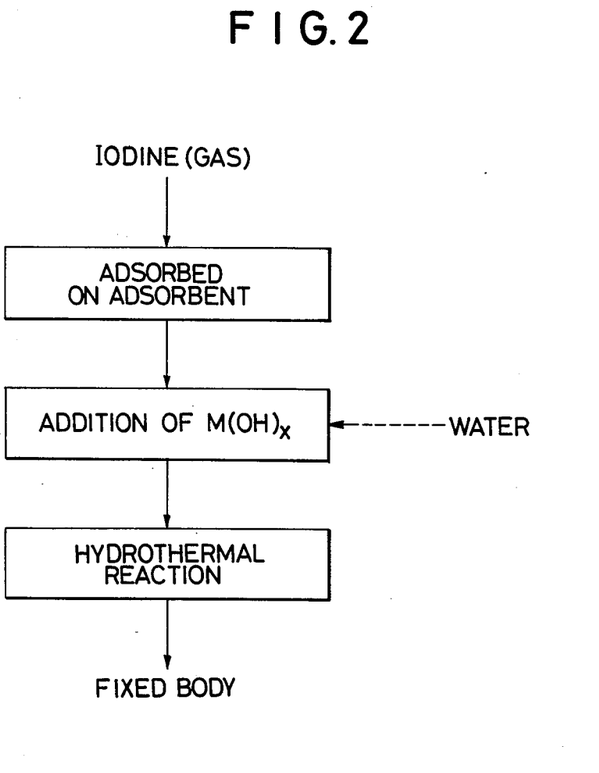
FIG. 2 is a block diagram showing a procedure for fixing iodine sorbent according to the method of this invention.

FIG. 2 is a block diagram showing a procedure of fixing iodine sorbent according to this invention.

FIG. 1 and FIG. 2 are illustrative only and are not intended to limit the scope of this invention.

According to one method of this invention, incinerator ash is incorporated with NaOH and optionally $SiO_2$, followed by mixing, and the resulting mixture is subjected to hydrothermal reaction, whereby there is obtained a fixed body having the three-dimensional network of at least partially hydrated alkali-containing aluminosilicate. This fixed body holds metals therein.

According to the other method of this invention, iodine is allowed to be adsorbed onto a sorbent and the resulting iodine sorbent is incorporated with a hydroxide of alkali metal or alkaline earth metal and optionally water, and the resulting mixture is subjected to hydrothermal reaction, whereby there is obtained a fixed body having the three-dimensional network of at least partially hydrated alkali-containing aluminosilicate. This fixed body holds iodine in the form of very stable compounds such as AgI and $AgIO_3$. Therefore, the second method is very effective in fixing a sorbent which has adsorbed radioactive iodine.

Both fixing of incinerator ash and fixing of iodine sorbent in this invention provide very compact and strong fixed bodies, which are stable over a long storage period, with very little leaching of metal ions or iodine. The fixed bodies thus produced are much smaller in volume than the incinerator ash or iodine sorbent. The volume reduction to one-sixth or below is possible in the case of incinerator ash. The heating and compressing apparatus required for the method of this invention is nothing special, and the additives required for the process are cheap. Thus the fixation according to this invention can be carried out at a low running cost.

The method of this invention is easy to practice and is of practical use.

The invention will be understood more readily by reference to the following examples; however, these examples are intended to illustrate the invention and not to be construed to limit the scope of the invention.

EXAMPLE 1

An ash sample having the composition as shown in Table 1 was prepared by incinerating waste composed of softwood (10 wt%), cotton (34 wt%), computer printing paper (6 wt%), and polyethylene sheet (50 wt%). One kg of this ash sample was mixed with an aqueous solution of sodium hydroxide by spraying. (The amount and concentration of the NaOH solution are shown in the footnote to Table 2.) The mixture was subjected to hydrothermal reaction at 300 kg/cm$^2$ and 300° C. for 20 minutes, whereby the mixture was made into a fixed body.

The apparatus for hydrothermal reaction is made up of a stainless steel cylinder, a pair of stainless steel pistons fitted into both ends of the cylinder, and a 2-kW heating wire (3 mm in diameter) wound around the cylinder. At the center of the cylinder, there is formed a thermocouple well which extends near (2 mm) to the inner surface of the cylinder. The reaction temperature is detected by a thermocouple inserted in this well.

The cylinder is 100 mm in inside diameter and 160 mm in outside diameter and 300 mm long, and the piston is 120 mm long. A prescribed pressure was applied (in the compression direction) to the pistons by using an Instron type universal tester (made by Shimadzu Seisakusho Ltd.).

The thus obtained fixed body was dipped in distilled water at 70° C. for 24 hours and the rate of leaching was measured. The results are shown in Table 2.

The above-mentioned experiment was repeated, except that the temperature of hydrothermal reaction was changed to 150° C., 200° C., and 350° C. The results are shown in Table 2.

EXAMPLE 2

Fixed bodies were produced in the same manner as in Example 1, except that the concentration and amount of NaOH solution and the reaction temperature were changed as shown in the footnote to Table 3. The fixed bodies were examined for the rate of leaching in the same manner as in Example 1. The results are shown in Table 3.

EXAMPLE 3

Fixed bodies were produced in the same manner as in Example 1, except that the concentration and amount of NaOH solution and the reaction pressure were changed as shown in the footnote to Table 4. The fixed bodies were examined for the rate of leaching in the same manner as in Example 1. The results are shown in Table 4. (In the following examples, the rate of leaching was measured in the same manner as in Example 1.)

EXAMPLE 4

Fixed bodies were produced in the same manner as in Example 1, except that the concentration and amount of NaOH solution and the reaction time were changed as shown in the footnote to Table 5. The fixed bodies were examined for the rate of leaching in the same manner as in Example 1. The results are shown in Table 5.

EXAMPLE 5

Figure 3:
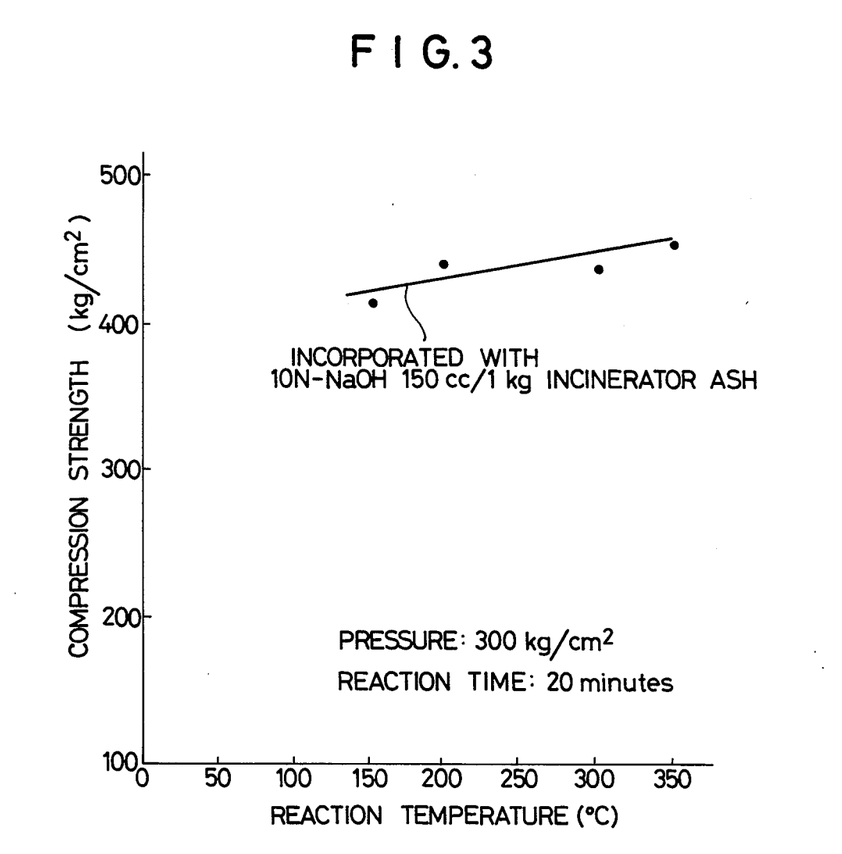
FIGS. 3 to 6 are graphs showing the results in the examples.

Fixed bodies were produced in the same manner as in Example 1, except that 150 cc of 10N NaOH aqueous solution was added and the reaction temperature was varied in the range of 150° to 350° C. The fixed bodies were examined for compression strength. The results are shown in FIG. 3.

EXAMPLE 6

Figure 4:
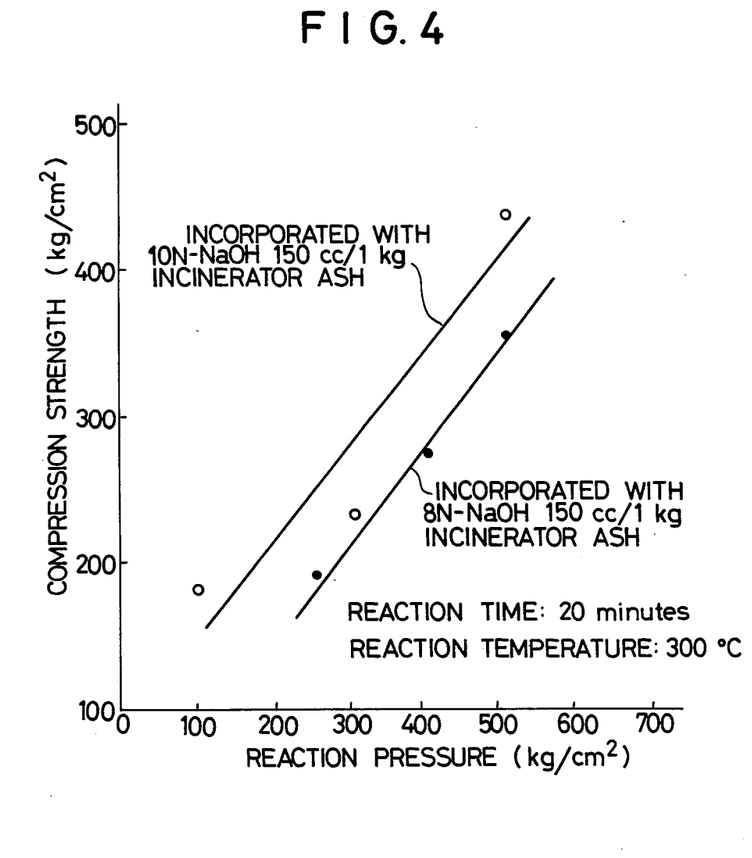

Fixed bodies were produced in the same manner as in Example 1, except that 150 cc of 10N NaOH aqueous solution was added and the pressure for hydrothermal reaction was varied in the range of 100 to 500 kg/cm$^2$. The fixed bodies were examined for compression strength. The results are shown in FIG. 4.

EXAMPLE 7

Fixed bodies were produced in the same manner as in Example 6, except that 9N NaOH aqueous solution was used. The fixed bodies were examined for compression strength. The results are shown in FIG. 4.

EXAMPLE 8

Figure 5:
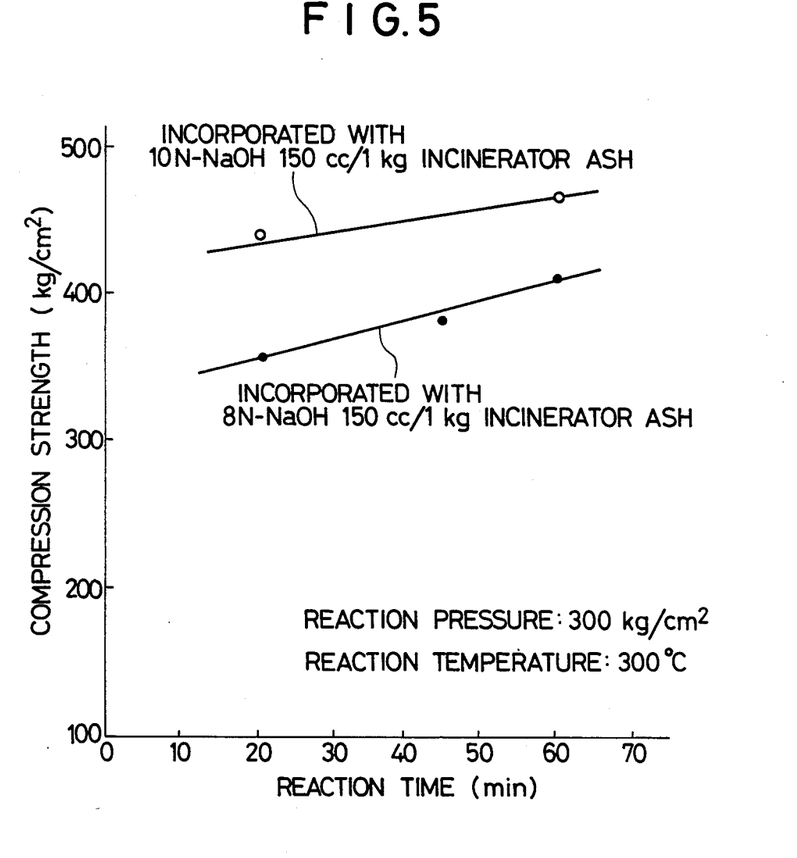

Fixed bodies were produced in the same manner as in Example 1, except that 150 cc of 10N NaOH aqueous solution was added and the pressure for hydrothermal reacttion was established at 500 kg/cm$^2$ and the reaction time was changed in the range of 20 minutes to 60 minutes. The fixed bodies were examined for compression strength. The results are shown in FIG. 5.

EXAMPLE 9

Fixed bodies were produced in the same manner as in Example 8, except that 8N NaOH aqueous solution was used. The fixed bodies were examined for comparison strength. The results are shown in FIG. 5.

EXAMPLE 10

Figure 6:
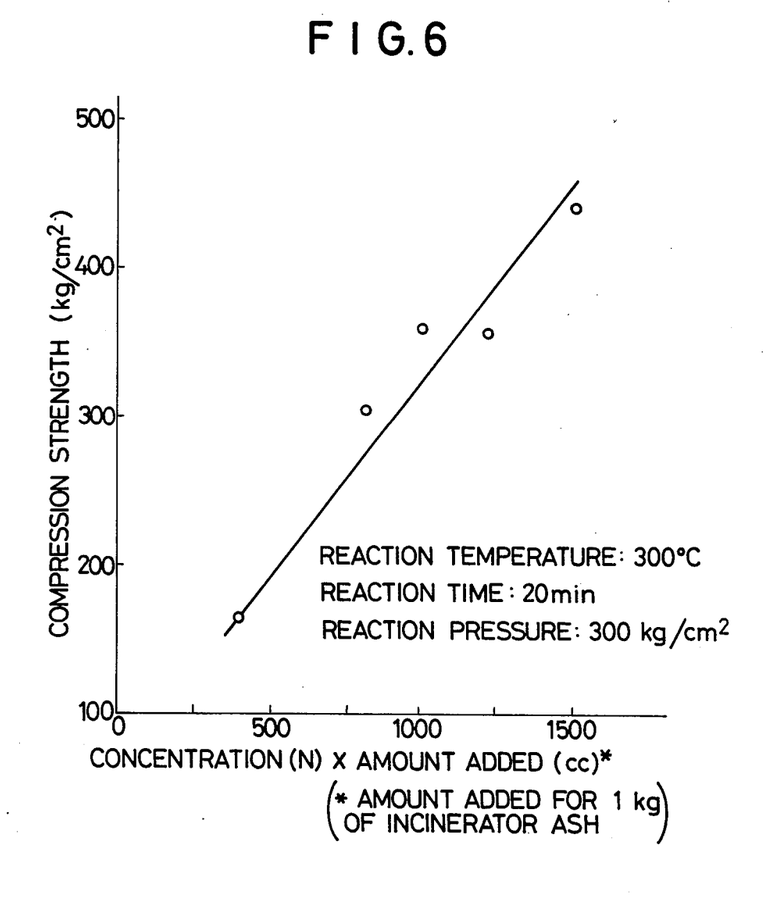

Fixed bodies were produced in the same manner as in Example 1, except that the concentration and amount of NaOH aqueous solutin were changed. The fixed bodies were examined for compression strength. The results are shown in FIG. 6.

The results of the above-mentioned examples indicate that according to the method of this invention incinerator ash can be made into a small strong fixed body which is resistant to leaching. The volume of the incinerator ash is reduced to about one-sixth by the method of fixation.

TABLE 1

| Properties and Composition of Incinerator Ash | |
|---|---|
| Items | Values |
| Physical properties | |
| True density (g/cm$^3$) (pycnometer method) | 3.12 |
| Bulk density (loose packing) (g/cm$^3$) | 0.34 |
| (closest packing) (g/cm$^3$) | 0.59 |
| Angle of repose | 47° |
| Composition (wt %) | |

TABLE 1-continued

Properties and Composition of Incinerator Ash

| Items | Values |
| --- | --- |
| Water | 0.14 |
| Loss on ignition | 0.72 |
| $SiO_2$ | 36.41 |
| $Al_2O_3$ | 16.70 |
| CaO | 6.84 |
| $Fe_2O_3$ | 16.44 |
| MgO | 9.68 |
| $Na_2O$ | 1.11 |
| $K_2O$ | 0.66 |
| $Cr_2O_3$ | 0.15 |
| $TiO_2$ | 1.06 |
| $SO_4{}^-$ | 3.33 |
| $Cl^-$ | 0.4 |
| Others | 6.31 |
| Total | 100.00 |

TABLE 2

Reaction Temperature and Rate of Leaching (*1)

| Reaction temperature (°C) | Rate of leaching (g/cm³ · day) |
| --- | --- |
| 150 | $2.17 \times 10^{-2}$ |
| 200 | $1.83 \times 10^{-2}$ |
| 300 | $7.95 \times 10^{-3}$ |
| 350 | $7.05 \times 10^{-3}$ |

Reaction pressure: 300 kg/cm²
Reaction time: 20 min
Amount of alkali aqueous solution added: 10N—NaOH 150 cc/1 kg incinerator ash (*2)(*3)
(*1) The loss of weight per unit volume which takes place when the fixed body is dipped in distilled water at 70° C. for 24 hours. The amount of distilled water is 8 cm³ per cm² of the surface area of fixed body. This applies to Tables 2 and 3.
(*2) The content of $Na_2O$ is 6.71% if the amount of water added and the amount of water derived from NaOH are deducted.
(*3) The amount of water added is 15.4 parts by weight for 100 parts by weight of ash and $Na_2O$ in total.

TABLE 3

Reaction Pressure and Rate of Leaching

| No. | Reaction pressure (kg/cm²) | Rate of leaching (g/cm³ · day) |
| --- | --- | --- |
| a | 97 | $1.24 \times 10^{-2}$ |
| b | 253 | $7.50 \times 10^{-3}$ |
| c | 304 | $7.79 \times 10^{-3}$ |
| d | 405 | $1.15 \times 10^{-2}$ |
| e | 506 | $1.03 \times 10^{-2}$ |
| f | 506 | $7.95 \times 10^{-3}$ |

Reaction temperature: 300° C.
Reaction time: 20 min
Amount of alkali aqueous solution added:
a, c, f = 10N—NaOH 150 cc/1 kg incinerator ash
(The content of $Na_2O$ is 6.71%, and the amount of water added is 15.4 parts by weight for 100 parts by weight of ash and $Na_2O$ in total.)
b, d, e = 8N—NaOH 150 cc/1 kg incinerator ash
(The content of $Na_2O$ is 4.66%, and the amount of water added is 15.5 parts by weight for 100 parts by weight of ash and $Na_2O$ in total.)

TABLE 4

Reaction Pressure and Rate of Leaching

| No. | Reaction time (min) | Rate of leaching (g/cm³ · day) |
| --- | --- | --- |
| g | 20 | $7.95 \times 10^{-3}$ |
| h | 20 | $1.03 \times 10^{-2}$ |
| i | 30 | $1.72 \times 10^{-2}$ |
| j | 45 | $1.33 \times 10^{-2}$ |
| k | 60 | $7.83 \times 10^{-3}$ |
| l | 60 | $1.08 \times 10^{-2}$ |

Reaction pressure: 300 kg/cm²
Reaction temperature: 300° C.
Amount of alkali aqueous solution added:
g, k = 10N—NaOH 150 cc/1 kg incinerator ash
h, i, j, l = 8N—NaOH 150 cc/1 kg incinerator ash

TABLE 5

Amount of Alkali Added and Rate of Leaching

| Amount of NaOH aqueous solution | | Rate of leaching (g/cm³ · day) | Water (*1) | $Na_2O$ (*2) |
| --- | --- | --- | --- | --- |
| 4 N | 150 cc | $1.78 \times 10^{-2}$ | 15.6 | 2.29 |
| 6 N | 150 cc | $1.86 \times 10^{-2}$ | 15.5 | 3.79 |
| 8 N | 150 cc | $1.03 \times 10^{-2}$ | 15.5 | 4.66 |
| 10 N | 150 cc | $7.95 \times 10^{-3}$ | 15.4 | 6.71 |
| 4 N | 100 cc | $1.03 \times 10^{-2}$ | 10.2 | 2.67 |
| 8 N | 100 cc | $6.53 \times 10^{-3}$ | 10.4 | 4.18 |
| 10 N | 100 cc | $1.62 \times 10^{-2}$ | 10.5 | 4.91 |

Reaction temperature: 300° C.
Reaction time: 20 min
Reaction pressure: 300 kg/cm²
Amount of alkali aqueous solution added: 10N—NaOH 150 cc/1 kg incinerator ash (*2)(*3)
(*1) The amount of water added for 100 parts by weight of ash and $Na_2O$ in total.
(*2) The content of $Na_2O$ which is calculated by deducting the amount of water added after the addition of NaOH aqueous solution.

EXAMPLE 11

An iodine-adsorbed sorbent was prepared by allowing 10 kg of silver-loaded zeolite ("Silver Zeolite, Type III", a product of Rasa Industries Ltd., 10 to 16 mesh or 2 to 1.19 mm in particle diameter) and 2 kg of iodine to stand in a 20-liter closed container until iodine disappears by volatilization. One kg of this sorbent sample was mixed with 200 cc of 6N NaOH aqueous solution by spraying for 1 minute. The mixture was subjected to hydrothermal reaction at 300 kg/cm² and 200° C. for 30 minutes by using the same apparatus as used in Example 1, whereby the mixture was made into a fixed body. The thus obtained fixed body was examined for compression strength by using the same apparatus as used in Example 1. (Pressure was applied to both ends of the cylindrical fixed body.) The results are shown in Table 7.

The thus obtained fixed body was dipped in distilled water at 70° C. for 24 hours and the rate of iodine leaching was measured. The results are also shown in Table 7.

The rate of leaching was calculated from the amount of iodine which had leached out when the fixed body was dipped in distilled water at 70° C. for 24 hours. The amount of distilled water was 8 cm³ per cm² of the surface area of fixed body. The methods used in this Example for measuring the compression strength and the rate of leaching are applied to the following Examples 12 to 16.

EXAMPLES 12 to 14

Fixed bodies were produced in the same manner as in Example 11, except that the reaction pressure, temperature, and time were changed as shown in Table 6. The fixed bodies were examined for strength and the rate of leaching in the same manner as in Example 11. The results are shown in Table 7.

EXAMPLES 15 and 16

Fixed bodies were prepared in the same manner as in Example 11, except that the sodium hydroxide was replaced by 6N aqueous solution of potassium hydroxide in Example 15 and barium hydroxide $(Ba(OH)_2 \cdot 8H_2O)$ crushed in the same particle size as the silver zeolite was used in an amount of 2 g for 9 g of the silver zeolite in Example 16. The reaction conditions are shown in Table 6. The fixed bodies thus obtained were examined for strength and the rate of leaching. The results are shown in Table 7.

It is noted from Table 7 that according to the method of this invention iodine sorbent can be made into a very strong fixed body which is highly resistant to leaching.

TABLE 6

| Example No. | Additive | Reaction Conditions | | | |
|---|---|---|---|---|---|
| | | Amount added (cc) | Pressure (kg/cm$^2$) | Temperature (°C.) | Time (min) |
| 11 | 6N NaOH | 200 | 300 | 200 | 30 |
| 12 | 6N NaOH | 200 | 300 | 300 | 30 |
| 13 | 6N NaOH | 200 | 300 | 400 | 30 |
| 14 | 6N NaOH | 100 | 300 | 300 | 30 |
| 15 | 6N KOH | 200 | 300 | 300 | 30 |
| 16 | Ba(OH)$_2$.8H$_2$O | 200 | 300 | 300 | 30 |

TABLE 7

| Example No. | Measured Values | |
|---|---|---|
| | Compression strength (kg/cm$^2$) | Rate of leaching (g/cm$^2$/day) |
| 11 | 450 | $6 \times 10^{-5}$ |
| 12 | 980 | $1 \times 10^{-3}$ |
| 13 | 1200 | $2 \times 10^{-3}$ |
| 14 | 1150 | $2.5 \times 10^{-3}$ |
| 15 | 1050 | $9 \times 10^{-4}$ |
| 16 | 1200 | $8 \times 10^{-4}$ |

What is claimed is:

1. A method for fixing incinerator ash containing SiO$_2$ and Al$_2$O$_3$, said method comprising incorporating the incinerator ash with NaOH or NaOH and an SiO$_2$-containing substance in such an amount that resulting mixture contains ≅to 90 wt% of SiO$_2$, 2 to 10 wt% of Na$_2$O, and more than 3 wt% of Al$_2$O$_3$ which is less than the content of SiO$_2$ in terms of mol%; mixing 100 parts by weight of the mixture with more than 5 parts by weight of water; and subjecting the resulting mixture to hydrothermal reaction under a pressure of 70 kg/cm$^2$ and above and at a temperature between 150° C. and 350° C. so that the mixture forms three-dimensional skeleton structure of alkali-containing aluminosilicate to fix and seal the incinerator ash with metals in the three-dimensional skeleton structure.

2. A method for fixing incinerator ash as claimed in claim 1, wherein NaOH and water are added in the form of an aqueous solution of NaOH.

3. A method for fixing incinerator ash as claimed in claim 1, wherein th SiO$_2$-containing substance is silica-stone or white clay.

4. A method for fixing incinerator ash as claimed in claim 1, in which said pressing procedure includes dividing the mixture into several parts, precompressing the respective parts separately, and pressing the several compressed parts at the same time under the predetermined pressure and temperature.

5. A method for fixing incinerator ash as claimed in claim 1, wherein water is added in an amount of 5 to 20 parts for 100 parts by weight of the mixture.

6. A method for fixing incinerator ash as claimed in claim 1, wherein the content of SiO$_2$ in the mixture is 30 to 60 wt%.

7. A method for fixing incinerator ash as claimed in claim 1, wherein the mixture contains one or more than one kind of metal oxide selected from Fe$_2$O$_3$, Cr$_2$O$_3$, MgO, CaO, TiO$_2$, and K$_2$O.

8. A method for fixing incinerator ash as claimed in claim 1, wherein the content of the metal oxide in the mixture is 40 wt%.

9. A method for fixing incinerator ash as claimed in claim 1, wherein the mixture contains SO$_4{}^{--}$ and/or Cl$^-$ in an amount less than 20 wt% in total.

10. A method for fixing incinerator ash as claimed in claim 1, wherein the heating temperature is 200° to 350° C.

11. A method for fixing incinerator ash as claimed in claim 1, wherein the time of hydrothermal reaction is 5 minutes to 1 hour.

12. A method for fixing incinerator ash as claimed in claim 1, wherein the hydrothermal reaction is accomplished by using an apparatus made up of a cylinder, a piston fitted into one end of the cylinder or two pistons fitted into both ends of the cylinder, and a reaction chamber at the center of the cylinder.

13. A method for fixing iiodine sorbent which comprises allowing iodine to be adsorbed onto a silver-loaded silicate adsorbent, incorporating the iodine sorbent with 1 to 30 wt% of at least one of sodium hydroxide, potassium hydroxide, and barium hydroxide; and subjecting the resulting mixture to hydrothermal reaction under a pressure of 70 kg/cm$^2$ and above and at a temperature between 150° C. and 350° C. so that the mixture forms three-dimensional skeleton structure of alkali-containing aluminosilicate to fix and seal the iodine sorbent in the three-dimensional skeleton structure.

14. A method for fixing iodine sorbent as claimed in claim 13, wherein the silicate adsorbent is zeolite and/or mordenite.

15. A method for fixing iodine sorbent as claimed in claim 13, wherein the silicate adsorbent is loaded with 5 to 50 wt% of silver.

16. A method for fixing iodine sorbent as claimed in claim 13, wherein the silicate adsorbent is loaded with 10 to 40 wt% of silver.

17. A method for fixing iodine sorbent as claimed in claim 13, wherein water is added in an amount of 5 to 20 parts for 100 parts by weight of the mixture.

18. A method for fixing iodine sorbent as claimed in claim 13, wherein the heating temperature is 200° to 350° C.

19. A method for fixing iodine sorbent as claimed in claim 13, wherein the time of hydrothermal reaction is 5 minutes to 1 hour.

20. A method for fixing iodine sorbent as claimed in claim 13, wherein the hydrothermal reaction is accomplished by using an apparatus made up of a cylinder, a piston fitted into one end of the cylinder or two pistons fitted into both ends of the cylinder, and a reaction chamber at the center of the cylinder.

21. A method for fixing iodine sorbent as claimed in claim 13, wherein iodine is radioactive iodine.

* * * * *